(12) United States Patent
Akamatsu et al.

(10) Patent No.: US 6,255,373 B1
(45) Date of Patent: Jul. 3, 2001

(54) CURABLE SILICONE RESIN COMPOSITION

(75) Inventors: Shoji Akamatsu; Motoshi Sasaki, both of Chiba (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/337,461

(22) Filed: Jun. 21, 1999

(30) Foreign Application Priority Data

Jul. 6, 1998 (JP) .................................................. 10-205867

(51) Int. Cl.⁷ .................................................. C09D 183/08
(52) U.S. Cl. ..................... 524/188; 524/262; 524/588; 427/387; 428/447; 106/287.11; 106/287.14
(58) Field of Search ..................... 524/588, 262, 524/188; 106/287.14, 287.11; 428/447; 427/387

(56) References Cited

U.S. PATENT DOCUMENTS

| | | | | |
|---|---|---|---|---|
| 5,039,736 | * | 8/1991 | Fujiki | 524/730 |
| 5,393,815 | * | 2/1995 | Takeda et al. | 524/262 |
| 5,709,741 | * | 1/1998 | Akamatsu et al. | 106/287.11 |
| 5,753,734 | * | 5/1998 | Maruyama | 524/267 |

FOREIGN PATENT DOCUMENTS 4-45181 * 2/1992 (JP) .

\* cited by examiner

*Primary Examiner*—Margaret G. Moore
(74) *Attorney, Agent, or Firm*—Timothy J. Troy

(57) ABSTRACT

A curable silicone resin composition contains (A) 100 parts by weight of a silicone resin having condensation-reactive group, (B) 1 to 100 parts by weight of an inorganic fine powder, (C) 0.5 to 50 parts by weight of a silazane compound; and (D) an arbitrary amount of an organic solvent. The curable silicone resin composition cures to form a cured coating film with excellent water-repellent properties.

19 Claims, No Drawings

CURABLE SILICONE RESIN COMPOSITION

FIELD OF THE INVENTION

This invention relates to a curable silicone resin composition. More specifically, this invention relates to a curable silicone resin composition capable of forming cured coating films with excellent water-repellent properties.

BACKGROUND OF THE INVENTION

Cured coating films with excellent water-repellent properties can be obtained by applying onto a substrate, a curable silicone resin composition (see Japanese Patent Publications Kokai Hei 3-244681, Hei 3-244996, and Hei 4-45181). The curable silicone resin consists of, at least, a silicone resin having a condensation-reactive group such as a silanol group, an oxime group or an alkoxy group bonded to a silicon atom, a fine inorganic powder, and an organic solvent. This composition is applied onto a substrate, and after the organic solvent is evaporated, a cross-linking reaction is caused by heating or due to absorption of moisture. However, coating films produced by curing these curable silicone resin compositions do not possess sufficient water-repellent properties.

Therefore, it is an object of this invention to provide a curable silicone resin composition capable of forming a cured coating film which possesses excellent water-repellent properties.

SUMMARY OF THE INVENTION

This invention relates to a curable silicone resin composition comprising (A)100 parts by weight of a silicone resin having a condensation-reactive group, (B) 1 to 100 parts by weight of a fine inorganic powder, (C) 0.5 to 50 parts by weight of a silazane compound; and (D) an arbitrary amount of an organic solvent.

DETAILED DESCRIPTION OF THE INVENTION

This invention relates to a curable silicone resin composition comprising (A) 100 parts by weight of a silicone resin having a condensation-reactive group, (B) 1 to 100 parts by weight of a fine inorganic powder, (C) 0.5 to 50 parts by weight of a silazane compound, and (D) an organic solvent.

Component (A) is a silicone resin that has a condensation-reactive group. A preferred condensation-reactive group is represented by a hydroxyl group, an alkoxy group such as a methoxy group or an ethoxy group, or an oxime group, wherein the aforementioned condensation-reactive group is bonded to a silicon atom. It is recommended that the condensation-reactive group in component (A) is used in an amount of 0.05 to 5 wt. %.

Preferably component (A) comprises a silicone resin which has a condensation-reactive group bonded to a silicon atom and which comprises a siloxane unit represented by the formula $RSiO_{3/2}$ and a siloxane unit represented by the formula $R_2SiO_{2/2}$. Preferably, the silicone resin is expressed by the following average unit formula $(RSiO_{3/2})_x$ $(R_2SiO_{2/2})_y$ $(SiO_{4/2})_z$, wherein each R can be the same or different monovalent hydrocarbon groups having 1 to 10 carbon atoms. Examples of these groups are alkyl groups such as methyl, ethyl, or propyl; alkenyl groups such as vinyl, allyl, or butenyl; aryl groups such as phenyl or tolyl; or halogenated alkyl groups such as 3,3,3-trifluoropropyl. In the above formula, x has a value of 0.2 to 0.9, which shows (in mole fraction) the quantity of siloxane units in the molecule having the formula $RSiO_{3/2}$; y has a value of 0.1 to 0.8, which shows (in mole fraction) the quantity of siloxane units in the molecule having the formula $R_2SiO_{2/2}$; and z has a value of 0 to 0.3, which shows (in mole fraction) the quantity of siloxane units in the molecule having the formula $SiO_{4/2}$; and x+y+z is equal to 1.

Since the quantity of condensation-reactive groups in the aforementioned average unit formula is small, they are not shown in the description above. However, these groups have the following unit formula: $XO_{1/2}$. In this formula, X shows groups with oxygen atoms removed from the aforementioned condensation reactive groups. The unit expressed by formula $XO_{1/2}$ shows that the silicone atoms in siloxane units of formula $RSiO_{3/2}$, siloxane units of formula $R_2SiO_{2/2}$, or siloxane units of formula $RSiO_{4/2}$ are connected via oxygen. It is recommended that the units expressed by formula $XO_{1/2}$ be used in such a mole quantity that the amount of the condensation-reactive groups (shown as XO) be within the range of 0.05 to 5 wt. %. Examples of such a silicone resin are a methyl silicone resin, a methylphenyl silicone resin, and a methylvinyl silicone resin.

Component (B) is a fine inorganic powder. Component (B) can be a fine silica powder, fine calcium carbonate powder, fine magnesium carbonate powder, fine alumina powder, or fine mica powder. Fine silica and calcium carbonate powders are preferred. The smaller the diameter of grains in component (B), the better are water-repellent properties in the obtained cured coating film. Therefore, it is recommended that the diameter does not exceed 10 μm. The fine inorganic powder may be surface treated. For example, fine powdered fumed silica may be subjected to hydrophobic treatment with dimethyldichlorosilane or hexamethyldisilazane.

Preferably, component (B) is used in the curable silicone resin composition in an amount of 1 to 100 parts by weight, preferably 1 to 50 parts by weight, and more preferably, 5 to 50 against 100 parts by weight of component (A). If the content of component (B) exceeds the recommended range, the cured coating film obtained will tend to decrease in physical properties. On the other hand, if the content of component (B) is below the recommended range, water-repellent properties of the coating film will be impaired.

Component (C) is a silazane compound. Component (C) significantly improves water-repellent properties in the coating film obtained by curing the curable silicone resin composition of this invention. The silazane compound of component (C) can be represented by a silazane polymer, a cyclic silazane, or a hexaorganodisilazane. Most preferably, component (C) is a hexaorganodisilazane. Examples of hexaorganodisilazanes include hexamethyl disilazane, 1,3-dihexyl-tetramethyl disilazane, 1,3-di-t-butyl-tetramethyl disilazane, 1,3-di-n-butyl-tetramethyl disilazane, and 1,3-diphenyl-tetramethyl disilazane.

Preferably, component (C) is used in the curable silicone resin composition in an amount of 0.5 to 50 parts by weight, preferably 1 to 20 parts by weight, against 100 parts by weight of component (A). If the content of component (C) exceeds the recommended range, the curable silicone resin composition will have a tendency to decrease in curability, and physical properties in the cured coating film will be impaired. On the other hand, if the content of component (C) is below the recommended range, water repellent properties of the coating film will be impaired.

Component (D) is an organic solvent. Component (D) is used for improving workability of the curable silicone resin composition. The organic solvent is exemplified by aromatic hydrocarbons such as toluene or xylene; aliphatic hydrocarbons such as hexane, heptane, or octane; ketones such as acetone or methyl- isobutyl ketone; or mixtures of the above solvents.

In the curable silicone resin composition, component (D) can be used in an arbitrary amount, which is selected with reference to viscosity of the curable silicone resin composition and the thickness of the coating film obtained after curing.

The curable silicone resin composition of the invention must contain at least components (A) through (D). However, they can be combined with other optional components, such as cross-linking agents and cross-linking accelerators.

Examples of the cross-linking agents include alkoxy silanes such as methyltrimethoxy silane, dimethyldimethoxy silane, vinyltrimethoxy silane, phenyltrimethoxy silane, diphenyldimethoxy silane, methyltriethoxy silane, dimethyl diethoxy silane, phenyl triethoxy silane, or diphenyl diethoxy silane or oxime silanes such as methyltris(methylethylketoxime) silane, dimethylbis(methylethylketoxime) silane, phenyltris(methylethylketoxime) silane, vinyltris(methylethylketoxime) silane, or diphenylbis(methylethylketoxime) silane. These cross-linking agents can be used individually or in a mixture of two or more. It is recommended that the cross-linking agent be used in an amount of 0.1 to 100 parts by weight, preferably 1 to 100 parts by weight, against 100 parts by weight of component (A).

The cross-linking accelerators are exemplified by diethylene triamine, triethylene tetramine, tetraethylene pentamine, dibutyltin dioctoate, dibutyltin diacetate, dibutyltin dilaurate, tin naphthonate, tin octoate, lead octoate, iron octoate, zinc octoate, tetrabutyl orthotitanate, tetraisopropyl orthotitanate, ethylacetoacetate aluminum diisopropylate, and aluminum tris (ethylacetate). It is recommended that these cross-linking accelerators be used in an amount of 0.1 to 20 parts by weight, preferably 0.1 to 10 parts by weight, against 100 parts by weight of component (A).

The curable silicone resin composition of the present invention can be applied onto surfaces by known methods, such as spraying, brushing, dipping, etc. The coatings can then be turned into cured coating films with excellent water-repellent properties by drying at room temperature or with heating.

The curable silicone resin composition of the invention is characterized by the ability of forming cured coating films with excellent water-repellent properties.

EXAMPLES

These examples are intended to illustrate the invention to those skilled in the art and should not be interpreted as limiting the scope of the invention set forth in the claims.

Reference Example 1

A method for forming a cured coating film from the curable silicone resin composition consists of applying the aforementioned composition to a glass substrate, drying it in air, and then heating for 15 min in an oven at 150° C. Contact angle for water on the curable coating film was measured with pure water at 25° C.

Example 1

A curable silicone resin composition was prepared from the following components:

(A) 15 g of a silicone resin consisting of $CH_3SiO_{3/2}$ units and $(CH_3)_2SiO_{2/2}$ units, wherein both units had silanol groups in an amount of 0.1 wt. %, $CH_3SiO_{3/2}$ units in an amount of 85 mole % and $(CH_3)_2SiO_{2/2}$ units in an amount of 15 mole %;

(B) 5.6 g of a fine-powdered fumed silica, the surface of which had a specific surface area of 200 $m^2/g$ and was subjected to hydrophobic treatment with dimethyldichlorosilane;

8.5 g of methyl tris(methylethylketoxime) silane;

0.5 g of dibutyltin diacetate; and (C) 2 g of hexamethyl disilazane.

The components were then uniformly mixed with (D) a mixed solvent consisting of toluene and heptane combined in a 1:2 weight ratio. The solvent was used in such an amount that after mixing with the aforementioned components, the solids content was 30 wt. %.

The composition prepared and cured according to Reference Example 1 and formed into a 25 μm-thick cured coating film. Contact angle of water on this cured coating film was 150°.

Example 2

A curable silicone resin composition was prepared from the following components:

(A) 20 g of a silicone resin consisting of $CH_3SiO_{3/2}$ units and $(CH_3)_2SiO_{2/2}$ units, wherein both units had silanol groups in an amount of 0.1 wt. %, $CH_3SiO_{3/2}$ units in an amount of 85 mole % and $(CH_3)_2SiO_{2/2}$ units in an amount of 15 mole %;

(B) 8.5 g of a fine-powdered fumed silica, the surface of which had a specific surface area of 200 $m^2/g$ and was subjected to hydrophobic treatment with dimethyldichlorosilane;

8.5 g of methyl tris(methylethylketoxime) silane;

0.5 g of dibutyltin dilaurate; and (C) 2 g of 1,3-dihexyltetramethyldisilazane.

The components were then uniformly mixed with (D) a mixed solvent consisting of toluene and heptane combined in a 1:2 weight ratio. The solvent was used in such an amount that after mixing with the aforementioned components the solids content was 30 wt. %.

The composition was prepared and according to Reference Example 1 and formed into a 25 μm-thick cured coating film. Contact angle of water on this cured coating film was 145°.

Example 3

A curable silicone resin composition was prepared from the following components:

(A) 30 g of a silicone resin consisting of $CH_3SiO_{3/2}$ units and $(CH_3)_2SiO_{2/2}$ units, wherein both units had silanol groups in an amount of 0.1 wt. %, $CH_3SiO_{3/2}$ units in an amount of 85 mole % and $(CH_3)_2SiO_{2/2}$ units in an amount of 15 mole %;

(B) 5.6 g of a fine-powdered fumed silica, the surface of which had a specific surface area of 200 $m^2/g$ and was subjected to hydrophobic treatment with dimethyldichlorosilane;

8.5 g of methyl tris(methylethylketoxime) silane;

0.5 g of dibutyltin diacetate; and (C) 2 g of 1,3-di-t-butyltetramethyl disilazane. The components were then uniformly mixed with (D) a mixed solvent consisting of toluene and heptane combined in a 1:2 weight ratio. The solvent was used in such an amount that after mixing with the aforementioned components the solids content was 30 wt. %.

The composition was prepared and cured according to Reference Example 1 and formed into a 25 μm-thick cured coating film. Contact angle of water on this cured coating film was 150°.

Example 4

A curable silicone resin composition was prepared from the following components:

(A) 15 g of a silicone resin consisting of $CH_3SiO_{3/2}$ units, $(CH_3)_2SiO_{2/2}$ units, and $C_6H_5SiO_{3/2}$, wherein all these units had silanol groups in an amount of 1 wt. %, $CH_3SiO_{3/2}$ units in an amount of 60 mole %, $(CH_3)_2SiO_{2/2}$ units in an amount of 20 mole %, and $C_6H_5SiO_{3/2}$ units in an amount of 20 mole %;

(B) 5.6 g of a fine-powdered calcium carbonate with an average grain size of 10 μm;

8.5 g of methyl tris(methylethylketoxime) silane;

0.5 g of dibutyltin dilaurate; and (C) 2 g of 1,3-dihexyltetramethyldisilazane. The components were then uniformly mixed with (D) a mixed solvent consisting of toluene and heptane combined in a 1:2 weight ratio. The solvent was used in such an amount that after mixing with the aforementioned components the solids content was 30 wt. %.

The composition was prepared and cured according to Reference Example 1 and formed into a 25 μm-thick cured coating film. Contact angle of water on this cured coating film was 140°.

Example 5

A curable silicone resin composition was prepared from the following components:

(A) 15 g of a silicone resin consisting of $CH_3SiO_{3/2}$ units, $(CH_3)_2SiO_{2/2}$ units, and $C_6H_5SiO_{3/2}$, wherein all these units had silanol groups in an amount of 1 wt. %, $CH_3SiO_{3/2}$ units in an amount of 60 mole %, $(CH_3)_2SiO_{2/2}$ units in an amount of 20 mole %, and $C_6H_5SiO_{3/2}$ units in an amount of 20 mole %;

(B) 5.6 g of a fine-powdered fumed silica the surface of which had a BET specific surface area of 200 $m^2/g$ and was subjected to hydrophobic treatment with dimethyldichlorosilane;

8.5 g of methyltrimethoxysilane;

0.5 g of dibutyltin dilaurate; and (C) 2 g of 1,3-di-t-butyltetramethyl disilazane. The components were then uniformly mixed with (D) a mixed solvent consisting of toluene and heptane combined in a 1:2 weight ratio. The solvent was used in such an amount that after mixing with the aforementioned components the solids content was 30 wt. %.

The composition was prepared and cured according to Reference Example 1 and formed into a 25 μm-thick cured coating film. Contact angle of water on this cured coating film was 150°.

Comparative Example 1

A curable silicone resin composition was prepared from the following components:

(A) 20 g of a silicone resin consisting of $CH_3SiO_{3/2}$ units and $(CH_3)_2SiO_{2/2}$ units, wherein both units had silanol groups in an amount of 0.1 wt. %, $CH_3SiO_{3/2}$ units in an amount of 85 mole % and $(CH_3)_2SiO_{2/2}$ units in an amount of 15 mole %;

(B) 5.6 g of a fine-powdered fumed silica, the surface of which had a specific surface area of 200 $m^2/g$ and was subjected to hydrophobic treatment with dimethyldichlorosilane;

8.5 g of methyltrimethoxysilane; and 0.5 g of dibutyltin diacetate.

The components were then uniformly mixed with (D) a mixed solvent consisting of toluene and heptane combined in a 1:2 weight ratio. The solvent was used in such an amount that after mixing with the aforementioned components the solids content was 30 wt. %.

The composition was prepared and cured according to Reference Example 1 and formed into a 25 μm-thick cured coating film. Contact angle of water on this cured coating film was 110°.

Comparative Example 2

A curable silicone resin composition was prepared from the following components:

(A) 20 g of a silicone resin consisting of $CH_3SiO_{3/2}$ units and $(CH_3)_2SiO_{2/2}$ units, wherein both units had silanol groups in an amount of 0.1 wt. %, $CH_3SiO_{3/2}$ units in an amount of 85 mole % and $(CH_3)_2SiO_{2/2}$ units in an amount of 15 mole %;

(B) 8.5 g of a fine-powdered fumed silica, the surface of which had a specific surface area of 200 $m^2/g$ and was subjected to hydrophobic treatment with hexamethyldisilazane;

8.5 g of methyl tris(methylethylketoxime) silane; and 0.5 g of dibutyltin dilaurate.

The components were then uniformly mixed with (D) a mixed solvent consisting of toluene and heptane combined in a 1:2 weight ratio. The solvent was used in such an amount that after mixing with the aforementioned components the solids content was 30 wt. %.

The composition was prepared and cured according to Reference Example 1 and formed into a 25 μm-thick cured coating film. Contact angle of water on this cured coating film was 100°.

Comparative Example 3

A curable silicone resin composition was prepared from the following components:

(A) 20 g of a silicone resin consisting of $CH_3SiO_{3/2}$ units, $(CH_3)_2SiO_{2/2}$ units, and $C_6H_5SiO_{3/2}$, wherein all these units had silanol groups in an amount of 1 wt. %, $CH_3SiO_{3/2}$ units in an amount of 60 mole %, $(CH_3)_2SiO_{2/2}$ units in an amount of 20 mole %, and $C_6H_5SiO_{3/2}$ units in an amount of 20 mole %;

(B) 5.6 g of a fine-powdered calcium carbonate with an average grain size of 10 μm; 8.5 g of methyl tris(methylethylketoxime) silane; and 0.5 g of dibutyltin diacetate.

The components were then uniformly mixed with (D) a mixed solvent consisting of toluene and heptane combined in a 1:2 weight ratio. The solvent was used in such an amount that after mixing with the aforementioned components the solids content was 30 wt. %.

The composition was prepared and cured according to Reference Example 1 and formed into a 25 μm-thick cured coating film. Contact angle of water on this cured coating film was 85°.

We claim:

1. A curable silicone resin composition comprising:

(A) 100 parts by weight of a silicone resin having a condensation-reactive group, wherein the silicone resin comprises a first unit having the formula $RSiO_{3/2}$, a second unit having the formula $R_2SiO_{2/2}$, and a condensation-reactive group having the formula $XO_{1/2}$, wherein each R is independently selected from monovalent hydrocarbon groups having 1 to 10 carbon atoms, each XO is independently selected from the group consisting of a hydroxyl group, an alkoxy group, and an oxime group, with the proviso that each condensation reactive group is bonded to a silicon atom;

(B) 1 to 100 parts by weight of a fine inorganic powder;
(C) 0.5 to 50 parts by weight of a silazane compound; and
(D) an organic solvent.

2. The composition of claim 1, wherein component (A) comprises units of the formulae:

$$(RSiO_{3/2})_x(R_2SiO_{2/2})_y(SiO_{4/2})_z$$

wherein each R is as defined above, x has a value of 0.2 to 0.9, y has a value of 0.1 to 0.8, z has a value of 0 to 0.3, with the proviso that x+y+z is 1, and wherein component (A) further comprises 0.05 to 5 wt. % of condensation reactive groups having the formula $XO_{1/2}$, wherein XO is as defined above.

3. The composition of claim 1, wherein the condensation-reactive groups in component (A) are present in an amount of 0.05 to 5 wt. %.

4. The composition of claim 1, wherein component (A) is selected from the group consisting of a first silicone resin comprising 85 mole % $CH_3SiO_{3/2}$ units having 0.1 wt. % silanol groups, 15 mole % $(CH_3)_2SiO_{2/2}$ units having 0.1 wt. % silanol groups, and a second silicone resin comprising 60 mole % $CH_3SiO_{3/2}$ units having 1 wt. % silanol groups, 20 mole % $(CH_3)_2SiO_{2/2}$ units having 1 wt. % silanol groups, and 20 mole % $C_6H_5SiO_{3/2}$ units having 1 wt. % silanol groups.

5. The composition of claim 1, wherein the fine inorganic powder comprises grains having a diameter that does not exceed 10 μm.

6. The composition of claim 1, wherein component (B) is selected from the group consisting of a fine silica powder and a fine calcium carbonate powder.

7. The composition of claim 6, wherein component (B) is a fine-powdered fumed silica which is subjected to hydrophobic treatment with dimethyldichlorosilane and which has a BET specific surface area of 200 $m^2/g$.

8. The composition of claim 1, wherein component (C) is selected from the group consisting of a silazane polymer, a cyclic silazane, and a hexaorganodisilazane.

9. The composition of claim 8, wherein component (C) is a hexaorganodisilazane selected from the group consisting of hexamethyl disilazane, 1,3-dihexyl-tetramethyl disilazane, 1,3-di-t-butyl-tetramethyl disilazane, 1,3-di-n-butyl-tetramethyl disilazane, and 1,3-diphenyl-tetramethyl disilazane.

10. The composition of claim 1, wherein component (D) is a selected from the group consisting of aromatic hydrocarbons, aliphatic hydrocarbons, ketones, and mixtures thereof.

11. The composition of claim 1, further comprising a cross-linking agent.

12. The composition of claim 11, wherein the cross-linking agent is selected from the group consisting of alkoxysilanes and oximesilanes.

13. The composition of claim 11, wherein the cross-linking agent is present in the composition at 0.1 to 100 parts by weight against 100 parts by weight of component (A).

14. The composition of claim 1, further comprising a cross-linking accelerator.

15. The composition of claim 14, wherein the cross-linking accelerator is selected from the group consisting of diethylene triamine, triethylene tetramine, tetraethylene pentamine, dibutyltin dioctoate, dibutyltin diacetate, dibutyltin dilaurate, tin naphthonate, tin octoate, lead octoate, iron octoate, zinc octoate, tetrabutyl orthotitanate, tetraisopropyl orthotitanate, ethylacetoacetate aluminum diisopropylate, and aluminum tris (ethylacetate).

16. The composition of claim 14, wherein the cross-linking accelerators is used in an amount of 0.1 to 20 parts by weight against 100 parts by weight of component (A).

17. A method for preparing a curable silicone resin composition comprising:
1) mixing a composition comprising components (A), (B), (C), and (D), wherein
    component (A) is 100 parts by weight of a silicone resin having a condensation-reactive group, wherein the silicone resin comprises a first unit having the formula $RSiO_{3/2}$, a second unit having the formula $R_2SiO_{2/2}$, and a condensation reactive group having the formula $XO_{1/2}$,
    wherein each R is independently selected from monovalent hydrocarbon groups having 1 to 10 carbon atoms, each XO is independently selected from the group consisting of a hydroxyl group, an alkoxy group, and an oxime group, with the proviso that each condensation reactive group is bonded to a silicon atom;
    component (B) is 1 to 100 parts by weight of a fine inorganic powder;
    component (C) is 0.5 to 50 parts by weight of a silazane compound; and
    component (D) is an organic solvent.

18. The method of claim 17, wherein the method further comprises
2) applying the product of step 1) to a substrate, and
3) curing the product of step 2).

19. A cured coating film prepared by the method of claim 18.

* * * * *